United States Patent [19]
Wratten

[11] Patent Number: 5,466,975
[45] Date of Patent: Nov. 14, 1995

[54] SWITCHED TERMINATION FOR BUS TAP-OFF LINE

[75] Inventor: Kenneth B. Wratten, San Jose, Calif.

[73] Assignee: The Whitaker Corporation, Wilmington, Del.

[21] Appl. No.: 107,351

[22] Filed: Aug. 13, 1993

[51] Int. Cl.⁶ ...................... H03K 17/00; H03K 19/0175
[52] U.S. Cl. .............................. 307/100; 307/98; 326/30
[58] Field of Search ..................... 333/124, 130, 333/22 R; 326/30, 62, 80, 81; 361/733, 788; 307/98, 99, 100; 395/325

[56] References Cited

U.S. PATENT DOCUMENTS 5,166,561  11/1994  Okura ..................................... 327/312
5,291,080   3/1994  Amagasaki ............................. 326/21

OTHER PUBLICATIONS

Quality Semiconductor, Inc. pp. 2–6 illustrate Bus Switches.
Chilton's ECN Electronic Component News, p. 7 shows Surface Mount Resistor–Capacitor–Diode Bus Termination Arrays.
Product Sheets from California Micro Devices Corp., pp. 8–11 shows types of termination devices used today.

Primary Examiner—William M. Shoop, Jr.
Assistant Examiner—Jonathan S. Kaplan
Attorney, Agent, or Firm—Kevin D. McCarthy

[57] ABSTRACT

An arrangement for terminating a tap-off line (40) between a bus line (14) and a bi-directional signal driver (38). The arrangement includes a resistor (42) serially connected in the tap-off line and a controllable switch (44) connected across the resistor. There is also provided means (46, 48) for controlling the switch to bypass the resistor when the bi-directional signal driver transmits signals to the bus.

4 Claims, 2 Drawing Sheets

SWITCHED TERMINATION FOR BUS TAP-OFF LINE

BACKGROUND OF THE INVENTION

This invention relates to a multi-board electronic system having a bus network and, more particularly, to an arrangement for switchably terminating the bus lines so that bi-directional signal drivers (i.e., transceivers) can be utilized.

A multi-board electronic system, such as a computer, typically includes a mother board, or backplane, having a plurality of edge connectors in which daughter boards are mounted. Printed circuit traces forming a bus network are provided on the mother board for interconnecting the connectors to provide communication paths between the various daughter boards. A desirable objective in such a system is to be able to space the daughter boards closely together in order to maximize the number of such boards supported on the mother board.

At one time, the spacing between daughter boards plugging into a mother board was determined by component height on the daughter board. The length of the printed circuit traces on the daughter boards from the bus drivers to the edge connector was determined by the most convenient parts placement on the daughter board. However, as clock and edge rates increase, the heavy capacitive loading of the buses and the ringing caused by long daughter board traces can cause severe degradation of signal quality and prevent the system from working properly.

It has been found that a low value series resistor inserted in the tap-off line, or stub, between a bus line and a receiver on the daughter board is effective in significantly reducing the signal degradation. However, the use of such a "damping resistor" is limited in that it must be at the receive end of the line. Placing a series resistor at the output of a driver to a bus line results in a voltage drop across the resistor, thereby sacrificing low level noise tolerance along the bus. The implication of this placement limitation is that the damping resistor approach is only useful for unidirectional lines. Many bus lines are bi-directional.

It is therefore a primary object of the present invention to provide a bi-directional implementation of the above-described simple resistive termination so as to allow its use in high speed digital busing applications.

SUMMARY OF THE INVENTION

The foregoing and additional objects are attained in accordance with the principles of this invention by providing an arrangement for terminating a tap-off line between a bus line and a bi-directional signal driver. The arrangement comprises a resistor serially connected in the tap-off line and controllable switch means connected across the resistor for selectively bypassing the resistor. Means are provided for controlling the switch means to bypass the resistor when the bi-directional signal driver transmits signals to the bus.

In accordance with an aspect of this invention, the switch means includes a CMOS switch.

BRIEF DESCRIPTION OF THE DRAWINGS

The foregoing will be more readily apparent upon reading the following description in conjunction with the drawings in which like elements in different figures thereof are identified by the same reference numeral and wherein.

DETAILED DESCRIPTION

Figure 1:
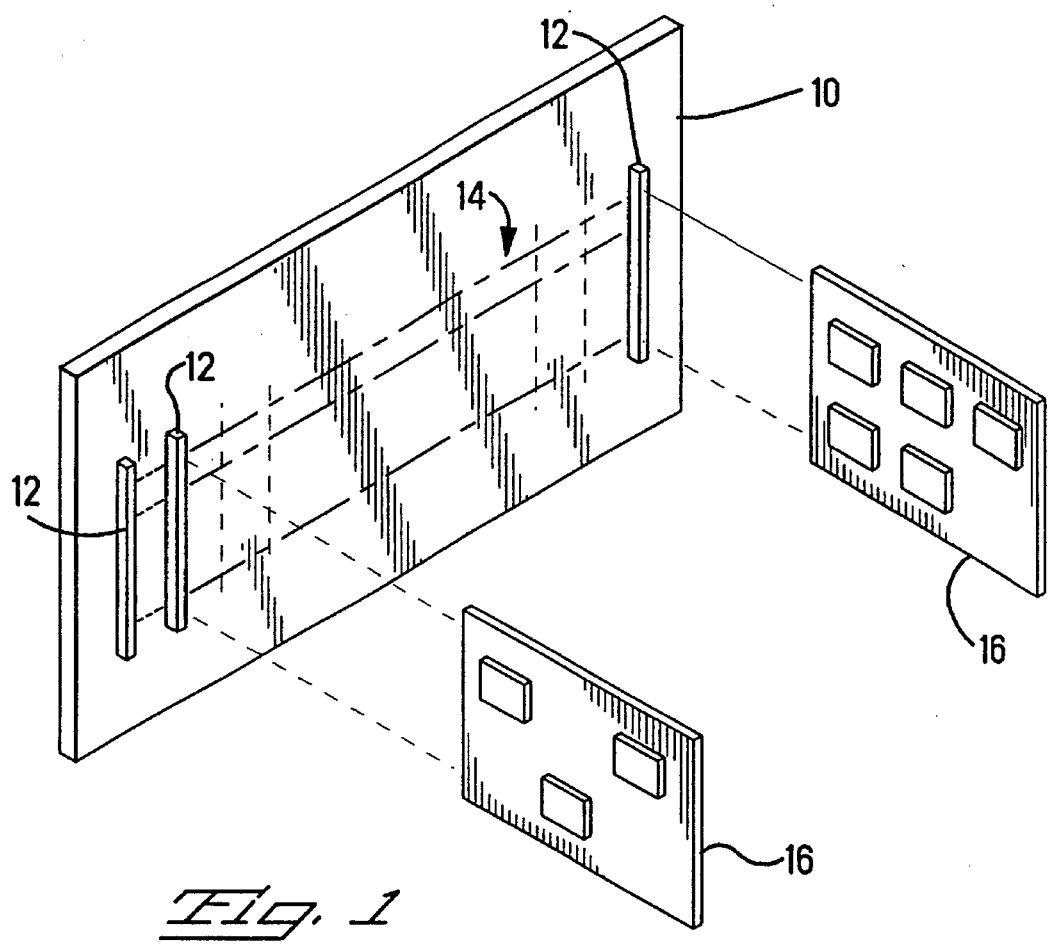
FIG. 1 is an exploded perspective view illustrating an electronic system including a mother board and a plurality of edge mounted daughter boards.

As shown in FIG. 1, the system environment in which the present invention finds utility includes a mother board, or back plane, 10 to which is mounted a plurality of edge connectors 12. Although edge connectors are shown and described, it is apparent that the present invention may be practiced with other mounting arrangements, such as two-piece connectors. Disposed on the mother board 10, either on the surface thereof or as a multi-layered configuration, is a multiline bus network 14 interconnecting the connectors 12. The system further includes a plurality of daughter boards 16 which are edge mounted to respective ones of the connectors 12. Typically, the electronic circuitry for the system is contained on the daughter boards 16 which communicate with each other over the bus network 14.

Figure 2:
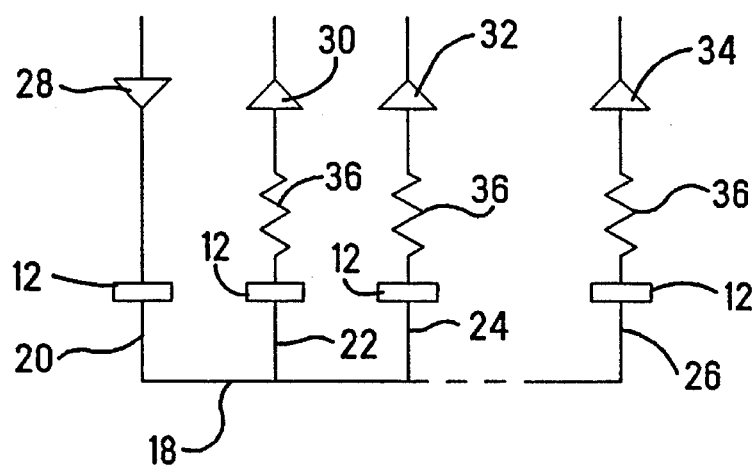
FIG. 2 illustrates the use of a "damping resistor" in unidirectional bus tap-off lines.

FIG. 2 illustrates an arrangement which may be utilized with a unidirectional bus line for terminating the tap-off lines to reduce the ringing at the receiver inputs. Thus, as shown in FIG. 2, a bus line 18 on the mother board 10 has tap-off lines 20, 22, 24 and 26 which each extend to a respective one of the daughter boards 16 through a respective one of the connectors 12. In the case of the tap-off line 20, it is connected to the output of the signal driver 28. On the other hand, the tap-off lines 22, 24 and 26 are connected to the inputs of respective receivers 30, 32 and 34. To prevent ringing at the inputs of the receivers 30, 32 and 34, a resistor 36 may be serially connected in each of the tap-off lines 22, 24 and 26.

While the tap-off line termination arrangement shown in FIG. 2 is effective in a unidirectional transmission system, when transmissions are bi-directional, a resistor cannot be inserted at the output of the signal driver 28 because it would prevent the driver 28 from driving the bus line 18 below a required threshold indicating a logic ZERO. In the past, the receivers 30, 32 and 34 were isolated from ringing on the bus line 18 either by shortening the length of the tap-off lines, by providing fewer connectors on the mother board, by lowering the transmission clock rate, by providing a slower edge rate for signals on the bus, or by some combination of the foregoing.

Figure 3:
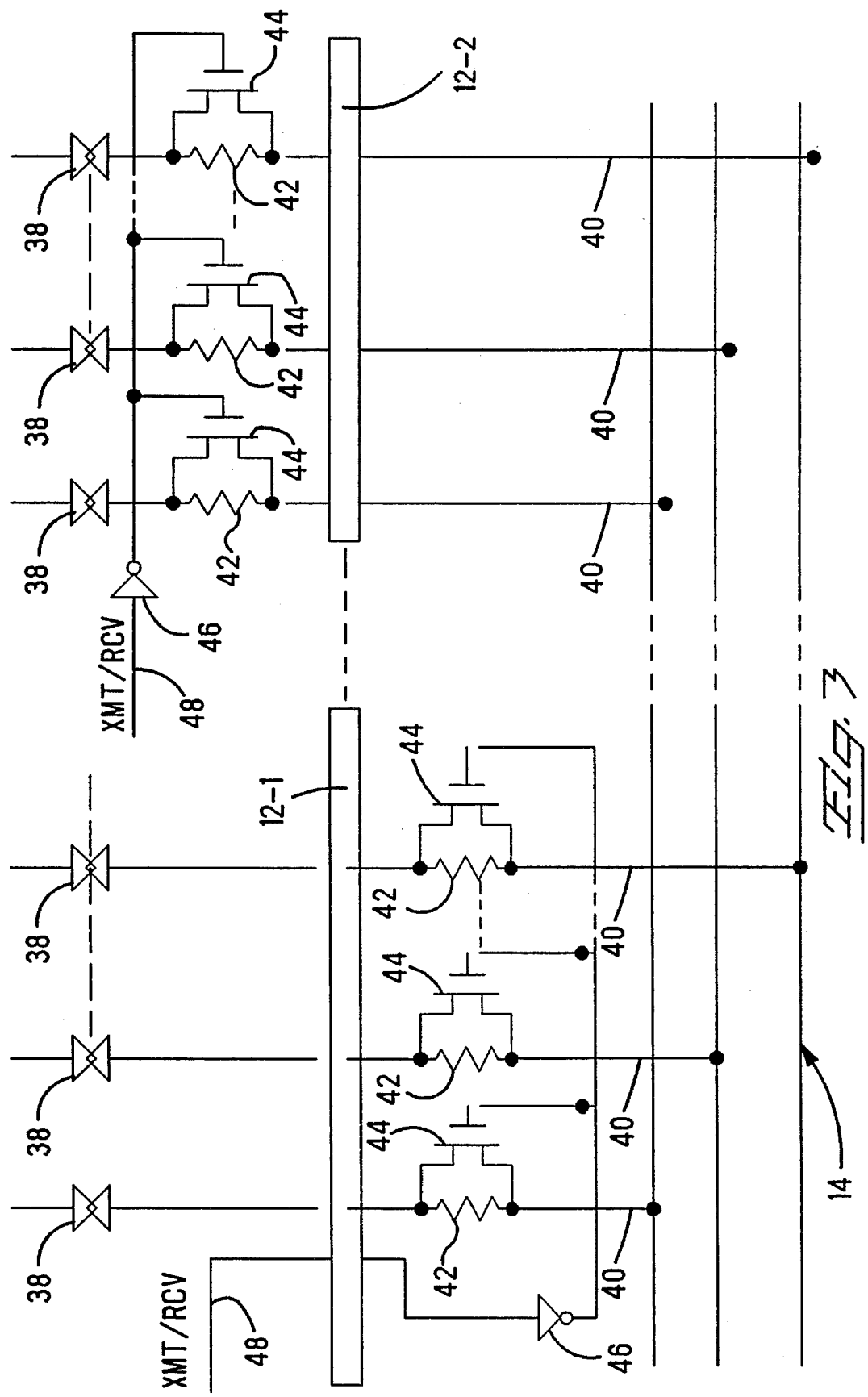
FIG. 3 illustrates switched terminations in accordance with the principles of this invention.

FIG. 3 illustrates a termination arrangement which may be utilized for bi-directional signaling. As shown in FIG. 3, the daughter board mounted to the connector 12-1 has a bi-directional signal driver/receiver, or transceiver, 38 connected to each of the bus tap-off lines 40. A resistor 42 is serially connected in each of the tap-off lines 40. A controllable switch 44 is connected across each of the resistors 42. Illustratively, the switch 44 is a CMOS bus switch manufactured by Quality Semiconductor, Inc. of Santa Clara, Calif. Such a switch is commonly used to route signals to different loads within a daughter board. According to the present invention, such a switch is utilized to selectively bypass the resistor 42 when the tap-off line 40 is being utilized to transmit signals to the bus network 14. Thus, the switch driver 46 has its input connected to the lead 48 which is the transmit/receive control lead on the daughter board. This lead 48 provides an appropriate signal to cause the switch 44 to close and bypass the resistor 42 when the bi-directional driver/receiver 38 is in the transmit mode and to allow the resistor 42 to be effective in the tap-off line 40 when the driver/receiver 38 is in the receive mode.

As described, the switched termination is on the mother board. This has the advantage that the daughter boards can remain of industry standard design. However, it has the disadvantage that an extra lead through the connector 12-1 is required. Alternatively, the arrangement shown on the right side of FIG. 3 can be utilized. In that arrangement, the entire switched termination is on the daughter board. The advantage of this arrangement is that there is no additional lead through the edge connector 12-2. However, industry standard daughter boards cannot be utilized. Therefore, depending upon the application, one of the two arrangements shown in FIG. 3 must be selected.

Accordingly, there has been disclosed an improved switched termination for a bus tap-off line. While illustrative embodiments of the present invention have been disclosed herein, it is understood that various modifications and adaptations to the disclosed embodiments will be apparent to those of ordinary skill in the art and it is only intended that this invention be limited by the scope of the appended claims.

I claim:

1. An arrangement for terminating a tap-off line (40) between a bus line (14) and a bi-directional signal driver (38), comprising a resistor (42) serially connected in the tap-off line between a bus line (14) and a bi-directional signal driver (38); controllable switch means (44) connected across said resistor for selectively bypassing said resistor; and means (46, 48) for controlling said switch means to bypass said resistor when said bi-directional signal driver transmits signals to said bus.

2. The arrangement according to claim 1 wherein said switch means includes a CMOS switch.

3. The arrangement according to claim 1 further including a first circuit board (10) and a second circuit board (16), and wherein:

said bus line (14) is on said first circuit board (10);

said signal driver (38) is on said second circuit board (16);

said first circuit board (10) has a connector (12-2) mounted thereto;

said second circuit board (16) is mounted to said connector (12-2);

said tap-off line (40) passes through said connector (12-2); and said resistor (42) and said switch means (44) are on said second circuit board (16).

4. The arrangement according to claim 1 further including a first circuit board (10) and a second circuit board (16), and wherein:

said bus line (14) is on said first circuit board (10);

said signal driver (38) is on said second circuit board (16);

said first circuit board (10) has a connector (12-1) mounted thereto;

said second circuit board (16) is mounted to said connector (12-1);

said tap-off line (40) passes through said connector (12-1);

said resistor (42) and said switch means (44) are on said first circuit board (10); and said means for controlling said switch means includes an electrical line (48) extending from said second circuit board (16) to said first circuit board (10) through said connector (12-1).

* * * * *